United States Patent [19]

Kameyama et al.

[11] Patent Number: 5,576,516
[45] Date of Patent: Nov. 19, 1996

[54] COVER OF BATTERY CONNECTING TERMINAL

[75] Inventors: Yasushi Kameyama, Hiroshima; Jun Ono, Shizuoka, both of Japan

[73] Assignee: Yazaki Corporation, Tokyo, Japan

[21] Appl. No.: 304,692

[22] Filed: Sep. 12, 1994

[30] Foreign Application Priority Data

Sep. 13, 1993 [JP] Japan .................................. 5-249700

[51] Int. Cl.$^6$ ........................................................ H01M 2/32
[52] U.S. Cl. ......................... 174/138 F; 439/522; 439/904
[58] Field of Search .................................. 174/138 F, 91,
174/92, 135, 188, 190; 439/135, 142, 149,
521, 522, 901, 904

[56] References Cited

U.S. PATENT DOCUMENTS

| | | | |
|---|---|---|---|
| 4,698,459 | 10/1987 | Drake | 174/138 F |
| 4,778,408 | 10/1988 | Morrison | 439/522 |
| 5,338,898 | 8/1994 | Luciano et al. | 174/138 F |
| 5,346,407 | 9/1994 | Hood | 439/522 |

FOREIGN PATENT DOCUMENTS 58-11864  1/1983  Japan.

Primary Examiner—Kristine L. Kincaid
Assistant Examiner—Paramita Ghosh
Attorney, Agent, or Firm—Sughrue, Mion, Zinn, MacPeak & Seas

[57] ABSTRACT

A protective cover for a terminal includes a cover base for holding a terminal, a cover body for covering a terminal mounted on the cover base, the cover body including, a freely operatable lid formed through a hinge and a temporary opening holding member for holding the freely operatable lid portion at a predetermined angle.

10 Claims, 9 Drawing Sheets

COVER OF BATTERY CONNECTING TERMINAL

BACKGROUND OF THE INVENTION

1. Field of the invention

This invention relates to a protective cover of a terminal for connecting posts on a plurality of stationary batteries, and relates to a protective cover of a connecting terminal wound onto a battery post. More particularly, it relates to a protective cover of a battery post connecting terminal that can be held as it is opened at a desired regulated angle.

2. Related Art

One of the problems with the development of commercial electric cars is the insufficiency of the electric capacity of stationary batteries. To deal with this problem, it is necessary to increase the electric capacity of stationary batteries by connecting their posts either in series or parallel. To interconnect battery posts, a plurality of batteries are placed side by side and electrically conductive connecting terminals are fixed to the respective posts to be connected.

Figures 8A, 8B:
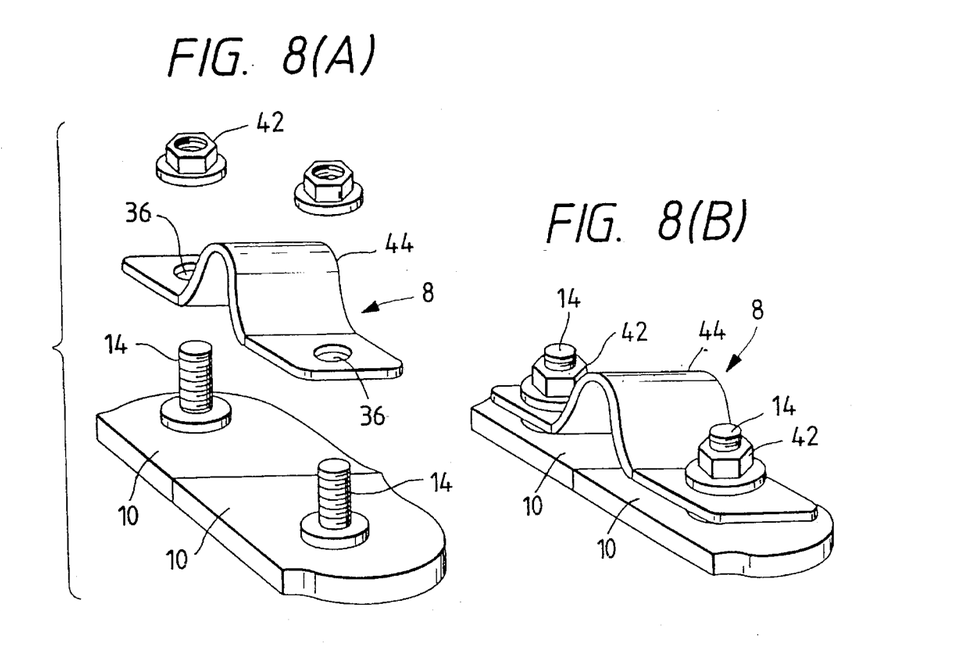

FIGS. 8 (A) and (B) shows how battery posts are to be connected; FIG. 8 (A) is a perspective view of the individual components yet to be assembled; and FIG. 8 (B) is a perspective view of the components as they as fixed to each other. A plurality of batteries 10 are placed side by side so that their battery posts 14 are adjacent to each other. A connecting terminal 8 is fixed to the battery posts 14, thereby establishing electrical connection between the two batteries 10. If the battery posts 14 are bolts, the connecting terminal 8 can be readily fixed to the posts by means of nuts 42 which are threadable over the bolts.

If the connected battery posts 14 are bare, they may be damaged upon contact with external objects and the damaged battery posts may deform too severely to prevent subsequent removal of the connecting terminal 8. Conversely, the distal ends of the battery posts 14 may damage other battery members such as wire harnesses.

Another problem with the bare state of electrically conductive portions such as battery posts 14 is that shorts may potentially occur upon contact with other conductive members.

To prevent direct exposure of the battery posts 14, they have to be protected with a cover. Various cover designs are known that are intended to protect single battery posts 14; however, cover designs capable of protecting a plurality of battery posts are available only at unsatisfactory levels principally because they often require complicated procedures for detachment. Under the circumstances, it is desired to develop post covers that can be easily mounted during the connection of battery posts 14.

Terminals connected to battery posts on the positive electrode side are provided with protective covers to prevent shorting with the vehicle's body. To insure high operational efficiency in connecting the terminals to the battery posts, the protective covers are so designed that they are free to open or close, as proposed in Unexamined Published Japanese Utility Model Application Sho 58-11864 or the like.

Figure 15:
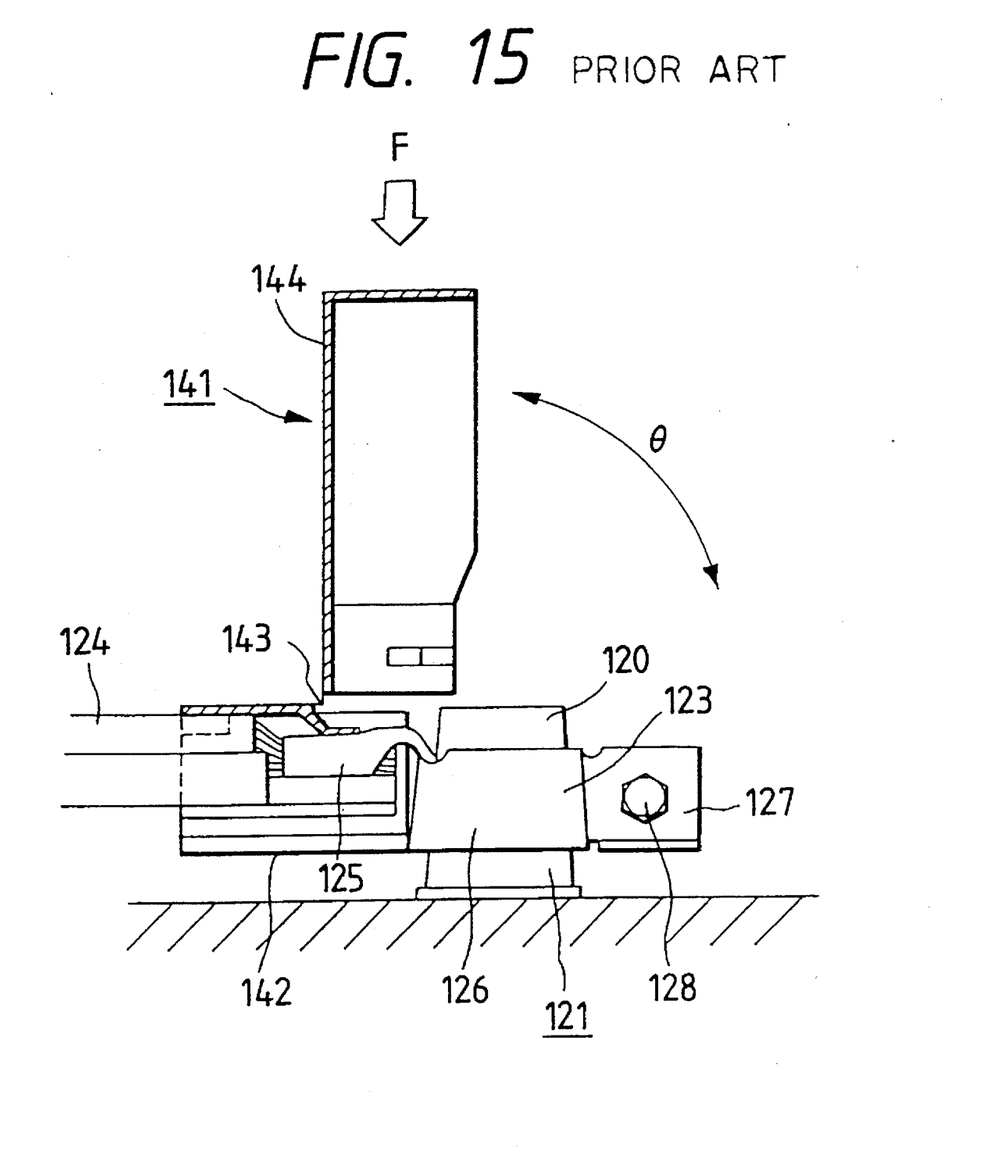
FIG. 15 is a partial sectional view of a conventional protective cover for a battery post connecting terminal.

FIG. 15 shows a conventional battery post connecting terminal; the connecting terminal 121 comprises an electrical contact portion 123 that is wrapped onto a battery post 120 and an electric wire connecting portion 125 for connecting an electric wire, and a protective cover 141 is so adapted that when it is mounted on the connecting terminal 121, it is capable of covering the entire part of the latter including the battery post 120. The protective cover 141 is made of a thermoplastic resin such as polypropylene or polyamide and comprises a cover portion 142 that encloses the electric wire connecting portion 125 and a lid portion 144 that serves as a lid over the electrical contact portion 123 via a hinge 143.

Before the connecting terminal 121 is wrapped onto the battery post 120, the protective cover 141 is mounted around the wire connecting portion 125 by means of the cover portion 142. The wrapping portion 126 of the terminal 121 is then slipped over the battery post 120 projecting from the top of the battery and by tightening a bolt 128 inserted through clamping lugs 127 formed at the distal end of the terminal 121, the latter is positively secured to the battery post 120.

The lid portion 144 of the protective cover 141 then pivots about the hinge 143 bordering on the cover portion 142, whereby not only the terminal 121 but also the bare portion of the electric wire 124 near the wire connecting portion 125 can be covered completely.

This offers the advantage that when installing or replacing batteries on a vehicle, the lid portion 144 can be freely put on the electrical contact portion 123 with the protective cover 141 being mounted on the connecting terminal 121; furthermore, the bolt 128 can be easily tightened or removed during maintenance, thereby assuring ease in connecting operations.

The conventional protective cover 141 however has had several problems. First, it is a one-piece molded part in which the cover portion 142 and the lid portion 144 are connected via the thin-walled hinge 143 to permit the cover to be freely opened or closed. Since it is difficult to insure satisfactory strength for the hinge 143, the latter may potentially break if an external force F is applied from above onto the protective cover in an open state. This possibility is particularly great when the hinge experiences deterioration over time as a result of repeated battery changes and the like.

Secondly, the freely openable protective cover 141, although it permits the electrical contact portion 123 to become exposed readily, has to be held open with clearance angle θ being wide enough to provide a free space for efficient performance of the operation to tighten or remove the bolt 128. In practice, however, this has required for the operator to assure the operating space by holding the protective cover 141 with one hand while performing the necessary work such as tightening the bolt with the other hand. As a result, it has been impossible to maintain a constant clearance angle θ for the protective cover 141 while it is open and, eventually, the cover has lowered the efficiency of tightening or loosening operations by serving as an obstacle.

SUMMARY OF THE INVENTION

An object, therefore, of the present invention is to provide a cover of a terminal for connecting batteries that protects the area where adjacent battery posts are connected together and which can be mounted or dismounted in an easy way.

Another object of the invention is to provide a protective cover of a battery post connecting terminal that will not easily break under external forces and which will in no way serve as an obstacle to the necessary operations even if it is held open, whereby not only the reliability of the cover but also the operating efficiency can be improved.

The first object of the invention can be attained by a cover of a terminal for connecting batteries comprising a cover base that is to be mounted over the posts on adjacent batteries to be connected together so that it is tightened to said posts together with said connecting terminal that is being held by it, and a cover body that is to be secured to said cover base for enclosing said connecting terminal and said posts, wherein said cover body includes a terminal cover portion having parts that are to be secured detachably to said cover base and a pair of post cover portions that are formed integrally with opposite edges of said terminal cover portion via hinges in such a way that they are free to open or close and which have temporary fixing portions that will engage each other when the two post cover portions are open, thereby maintaining them to be in an open state, as well as portions that are to be detachably secured to said cover base when said post cover portions are closed, wherein said cover base has fixing portions that will engage the parts to be secured of said terminal cover portion and those of said post cover portions.

The second object of the invention can be attained by a protective cover of a battery post connecting terminal comprising a cover portion for enclosing the electric wire connecting portion of the connecting terminal which also includes an electrical contact portion that is to be wrapped onto the battery post, a freely openable lid portion that is formed integrally with said cover portion via a hinge and which serves as a lid on said electrical contact portion, and a base portion that is to be placed on top of the battery and which holds said cover portion and said lid portion, the improvement wherein a contacting portion to insure that the angle through which the protective cover is to be opened is regulated to a desired value is provided in said lid portion and said cover portion in the opposing positions near said hinge and wherein lid engaging portions for holding the protective cover as it is opened at said desired angle are provided in said base portion.

The second object can be attained more effectively if the contacting portions are beveled surfaces that are formed in the rear end angular portion of said lid portion and in the front end angular portion of said cover portion and if the lid engaging portions are projecting lugs that are formed in the front sidewall portions of said base portion and which are each beveled on the top surface.

According to the present invention, the cover may be mounted on the connecting terminal by the following procedure. First, the pair of post cover portions of the cover body are temporarily fixed to each other in an open state. The terminal cover portion of said cover body is secured to the cover base as it holds the battery connecting terminal. Then, the connecting terminal and the cover base are secured together to the battery posts by tightening nuts of the like in the open space beneath each of the post cover portions. Thereafter, the post cover portions are disengaged from each other and secured to the cover base.

While the cover mounting operation is to be performed by this procedure, not all steps need be done at the site and, if desired, preassembling may be accomplished to such a stage that the connecting terminal is held on the cover base and the terminal cover portion of the cover body is secured to the cover base. By thus assembling the cover and the connecting terminal in the shop, the number of operating steps to be performed at the site of connecting batteries via terminals can be sufficiently reduced to provide great ease in the performance of battery post connecting and cover mounting operations.

To disconnect the batteries, one only need loosen and remove the nuts or the like with only the post cover portions of the cover body being opened or with the cover body being detached from the cover base; hence, the cover body will in no way provide an obstacle to the disconnecting operation.

The temporary fixing portions of the post cover portion, the portions to be fixed of the cover body and the fixing portions of the cover base and the portions to be fixed of the cover body are preferably molded integrally of the same resin as the material of the cover. If they are molded of resins, those portions will be capable of experiencing plastic deformation by a slight degree, providing ease in the performance of cover mounting and dismounting operations.

According to the protective cover of a battery post connecting terminal of the present invention, the contacting portion to insure that the angle through which the protective cover is to be opened is regulated to a desired value is provided in the lid portion and the cover portion in the opposing positions near the hinge and, in addition, the lid engaging portions for holding the protective cover as it is opened at the desired angle are provided in the base portion. This arrangement assures that if the protective cover which is initially in a closed state is opened to the desired angle, the contacting portions which are typically beveled surfaces that are formed in the rear end angular portion of the lid portion and in the front end angular portion of the cover portion contact each other to check further increase in the angle through which the protective cover can open.

Simultaneously with this contact of the beveled surfaces, the lateral end portions of the lid portion are brought into engagement with the lid engaging portions which are projecting lugs that are formed in the sidewall portions of the base portion. This arrangement assures that operations such as dismounting the connecting terminal from the battery post can be performed efficiently while the protective cover is held at the desired angle.

If the protective cover which is open to the desired angle receives an external force, the lateral end portions of the lid portion in engagement with the projecting lugs will slide down the beveled surfaces of the lugs until they come out of engagement with each other. As a result, the applied external force will not concentrate at the hinge and its breakage is prevented.

BRIEF DESCRIPTION OF THE DRAWINGS

FIG. 8 (A) is an exploded view of the components used to fix a conventional terminal for connecting battery posts;

FIG. 8 (B) is a perspective view of the conventional terminal in a fixed state;

FIG. 9 (a) and 9 (b) are perspective views of a protective cover of a battery post connecting terminal according to a third embodiment of the invention;

FIG. 12 (a) is a partial enlarged view of the contracting portions with the lid portion being closed;

FIG. 12 (b) is a partial enlarged view of the contacting portions with the lid portion being opened;

DETAILED DESCRIPTION OF THE PREFERRED EMBODIMENTS

Preferred embodiments are described below with reference to accompanying drawings. It should, however, be noted that these are not the sole cases of the invention.

First Embodiment

Figure 1:
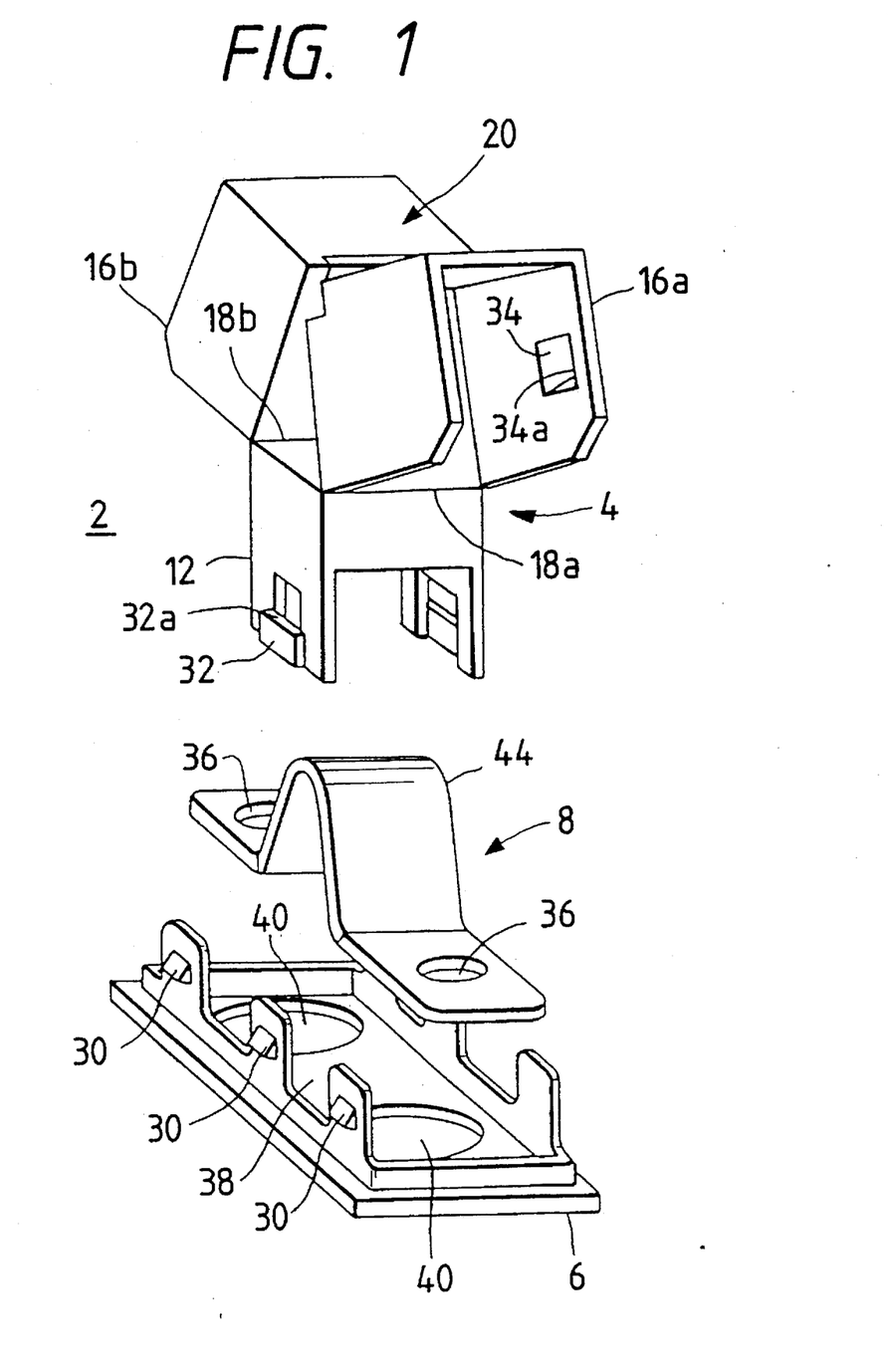
FIG. 1 is a diagram showing, in an unassembled state, a cover of a terminal for connecting battery posts according to a first embodiment of the invention.
Figure 2:
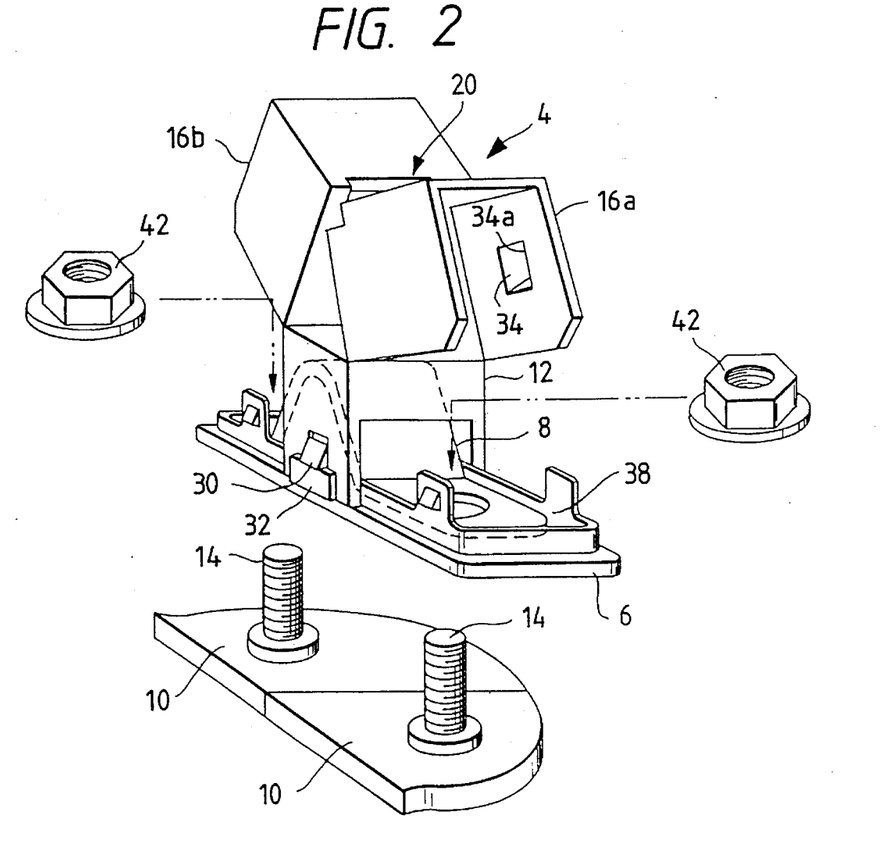
FIG. 2 is a perspective view of the cover in an assembled state.
Figure 3:
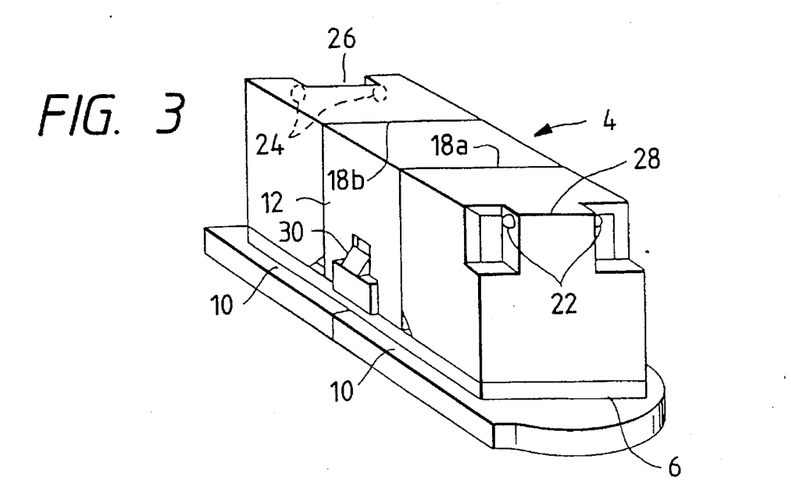
FIG. 3 is a perspective view showing the cover as it has been mounted on batteries.

FIG. 1 is a perspective view showing, in an unassembled state, the cover according to the first embodiment of the invention; FIG. 2 is a perspective view of the cover in an assembled state; and FIG. 3 is a perspective view of the cover as it has been mounted on battery posts.

The cover generally indicated by 2 is made of a resin and consists of a cover body 4 and a cover base 6, which can be assembled together to cover a battery connecting terminal 8 and battery posts 14. The cover body 4 consists of a terminal cover portion 12 that covers primarily the connecting terminal 8 which will establish electrical connection between adjacent batteries 10 and a pair of post cover portions 16a and 16b for covering a pair of battery posts 14. The terminal cover portion 12 and the post cover portions 16a and 16b may typically resemble a generally prismatic box with the base eliminated as shown in FIG. 1 and the terminal cover portion 12 is coupled to the post cover portions 16a and 16b via hinges 18a and 18b, respectively, which are formed along the top opposing edges of the terminal cover portion 12.

The post cover portions 16a and 16b are formed integrally with the terminal cover portions 12 via the hinges 18a and 18b; the post cover portions 16a and 16b are pivotal with respect to the terminal cover portion 12 so that they are opened to expose the battery posts 14 or closed to cover the posts. The hinges 18 can perform their function because they are made thinner than the other parts of the cover. FIGS. 1 and 2 show the case where the post cover portions 16a and 16b are open whereas FIG. 3 shows the case where they are closed.

The post cover portions 16a and 16b are provided with temporary fixing portions 20 that will engage each other to keep those portions in an open state. As one can see from FIG. 3 which shows the post cover portions 16a and 16b in a closed state, the temporary fixing portions 20 consist of engaging projections 22 that are formed on one post cover portion 16a (or 16b) and engaging recesses 24 that are formed on the other post cover portion 16b (or 16a).

One post cover portion 16b has a cutout 26 in the center of the top angular portion. The other post cover portion 16a has a cutout at both ends of the top angular portion, thereby forming a projecting part 28 in the center. To keep the two post cover portions 16a and 16b in an open state, the central projecting part 28 is pushed into the cutout 26, thereby bringing the projections 22 into engagement with the recesses 24. In the embodiment under consideration, projections 22 and recesses 24 are hemispheres but they are not limited in any particular way with respect to the shape and the areas in which they are formed; the only requirement to be met is that the engaging portions provided on the two post cover portions 16a and 16b should be brought into effective engagement with each other to fix their relative positions.

The terminal cover portion 12 has portions to be fixed 32, whereas the post cover portions 16a and 16b have portions to be fixed 34, and these portions to be fixed will engage fixing portions 30 on the cover base 6 which is to be described later in this specification. In the case shown, the portions to be fixed 32 which are formed on the terminal cover portion 12 have edges 32a that are brought into engagement by means of the fixing portions 30 on the cover base 6. The portions to be fixed 34 which are formed on the post cover portions 16a and 16b are recesses having edges 34a that are also brought into engagement by means of the fixing portions 30 on the cover base 6. The portions to be fixed 32 and 34, as well as the fixing portions 30 are such that if the portions to be fixed 32 and 34 pressed against the fixing portions 30 as they maintain the appropriate relative positions, the respective portions will deform plastically in a manner relative to each other, whereby they are brought into mutual engagement in a smooth way.

The terminal 8 for connecting the pair of battery posts 14 is made of a partly curved metal piece that has a hole 36 formed at either end in the longitudinal direction, through which the post is to be inserted. The cover base 6 has a retaining portion 38 formed in it so that it can receive and hold the connecting terminal 8 in position. The bottom surface of the retaining portion 38 has holes 40 through which the pair of battery posts can be inserted and which are concentric with the holes 36 in the connecting terminal 8 through which the posts are also to be passed.

The connecting terminal 8 and the cover base 6 are fastened together to the batteries 10, with the cover base being held between the terminal 8 and the batteries 10. If the battery posts 14 are bolts as in the case shown, the connecting terminal 8 can be secured to the cover base 6 by means of nuts 42. If the battery posts 14 are not bolts, other fastening means suitable for their shape may be used to fasten the connecting terminal 8 and the cover base 6 together to the batteries.

The cover body 4 is secured by being mounted on the cover base 6 as it retains the connecting terminal 8. The cover base 6 has fixing portions 30 formed outwardly of the cover in areas of vertical risers of the cover base 6. The fixing portions 30 function to establish engagement with the edges 32a and 34a of the portions to be fixed 32 and 34, respectively, of the cover body 4.

The cover body 4 is secured to the cover base 6 by insuring that the portions to be fixed 32 and 34 of the cover body 4 are brought into engagement with the corresponding fixing portions 30 of the cover base 6.

To connect the battery posts 14 by means of the terminal 8 and to mount the cover 2, the individual members may successively be mounted in such an order that the member that is positioned the closest to the batteries is first mounted and the member positioned the second closest is mounted next. If desired, the cover 2 and the connecting terminal 8 may be preassembled as shown in FIG. 2. To form the assembly shown in FIG. 2, the connecting terminal 8 is first retained on the cover base 6 and, then, the cover body 4 with the post cover portions 16a and 16b being opened and brought into mutual engagement, is mounted on the cover base 6 in such a way that the portions to be fixed 32 and 34 of the terminal cover portion 12 are secured by means of the fixing portions 30 of the cover base 6. The curved part 44 of the connecting terminal 44 is covered with the terminal cover portion 12 of the cover body 4 and the ridge of the curved part 44 is preferably in contact with the top surface of the terminal cover portion 12. If the curved part 44 is retained by the cover base 6 and if it is supported by contact with the top surface of the terminal cover portion 12, the curved part 44 can be prevented from rattling within the terminal cover portion 12.

If the cover body 4, the cover base 6 and the connecting terminal 8 are assembled as a unit with the terminal 8 being retained within the cover body 4 and the cover base 6, these members can be dealt with as a unit before the mounting operation is started and, hence, there is afforded ease in transport, storage and other operations. In this case, one only need carry an assembly of the cover 2 and the connecting terminal 8 to the site of mounting operation.

The assembly of the cover 2 and the connecting terminal 8 is mounted over the battery posts 14 at the site of connecting operation. At the site of connection, the battery posts 14 are inserted through the holes 40 in the cover base 6 and through the holes 36 in the connecting terminal 8 and, thereafter, nuts 42 may be tightened within the free space beneath each of the post cover portions 16a and 16b which are in an open state. This offers the advantage of facilitating the connecting operation even in a limited area. Once the nuts 42 have been tightened to secure the connecting terminal 8 to the battery posts 14, thereby completing the process of mounting the terminal 8, one only need close the post cover portions 16a and 16b and fix the respective portions 32 and 34 by bringing them into engagement with the corresponding fixing portions 30 of the cover base 6, whereby the mounting of the cover 2 is completed. FIG. 3 shows the external appearance of the cover 2 as it has been mounted over the battery posts.

By thusly mounting the cover 2 over the battery connecting portion, the connecting terminal 8 and the battery posts 14 can be rendered to have no possibility for contact with other members and, hence, can be protected against damage due to contact with external objects. In addition, the chance for contact with electrically conductive members is eliminated, thereby providing protection against electrical accidents such as shorts and leaks.

If the cover body 4, cover base 8 and the connecting terminal 8 are preassembled, the need to assemble them at the site of battery connection is eliminated, thereby contributing to a substantial reduction in the volume of work at the site of connection. As a further advantage, the cover 2 and the connecting terminal 8 can be stored collectively, rather than separately, thereby accomplishing effective use of the limited space for storage.

Second Embodiment

Figure 4:
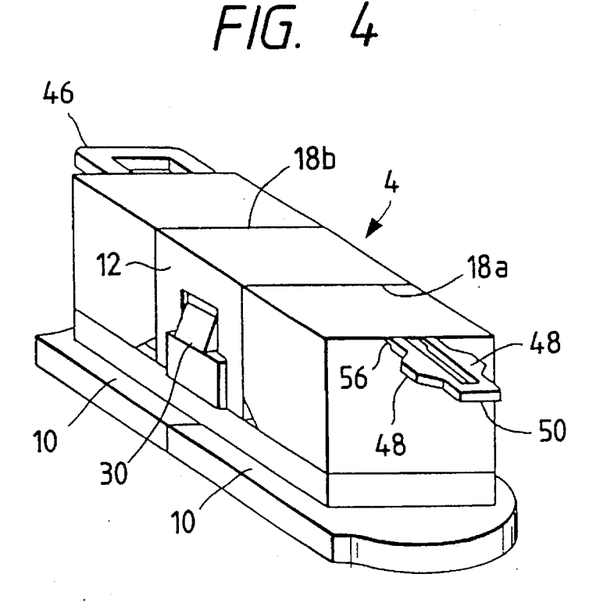
FIG. 4 is a perspective view of a cover of a terminal for connecting battery posts according to a second embodiment of the invention as it has been mounted on batteries.
Figure 5:
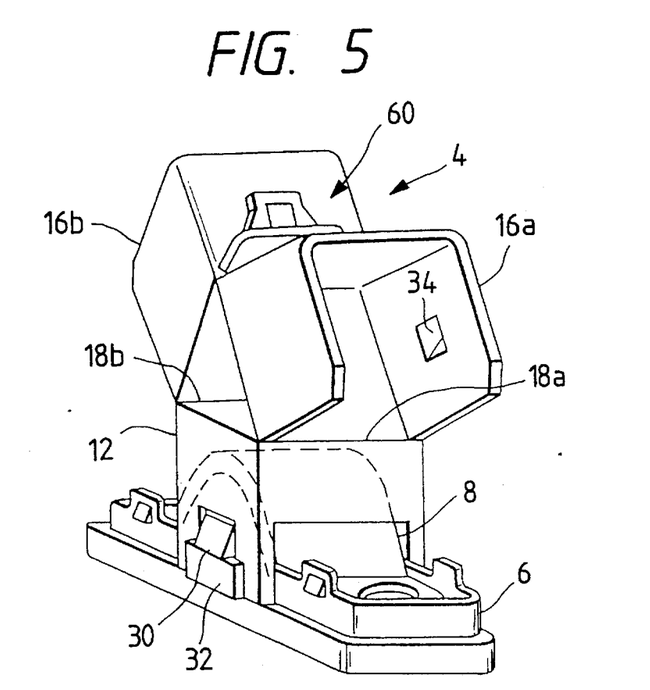
FIG. 5 is a perspective view of the cover in an assembled state.
Figure 6:
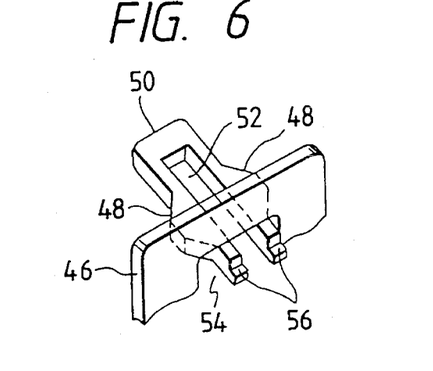
FIG. 6 is a perspective view showing the essential part of the cover.
Figure 7:
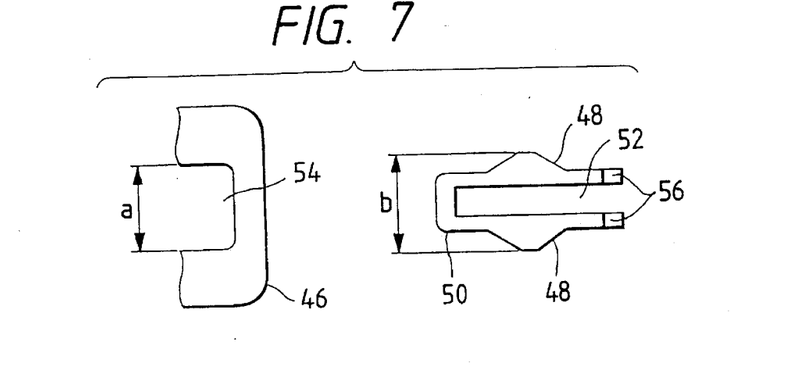
FIG. 7 is illustrates the essential part of the cover.

A second embodiment of the protective cover which attains the first object of the invention is next described with reference to FIGS. 4 to 7. FIG. 4 is a perspective view showing the external appearance of the cover as it is mounted over battery posts; FIG. 5 is a perspective view of the cover as it is being assembled; and FIGS. 6 and 7 illustrate the temporary fixing portions which are the essential part of the second embodiment.

The only difference between the second embodiment and the first embodiment concerns the temporary fixing portions that are formed in the post cover portions 16a and 16b of the cover body 4 and which are generally indicated by 60 in FIG. 5. The other aspects of the second embodiment are identical to those of the first embodiment and, hence, the following description is only directed to the different aspect.

In the cover of the second embodiment is provided that, the temporary fixing portions 60 consist of an engaging frame 46 and an engagement lug 50 having a bulging portion 48 on both sides that is to be inserted into the frame 46 for establishing engagement. The engaging frame 46 formed in one post cover portion 16a (or 16b) has a cutout 54 through which the engagement lug 50 can be inserted. The engagement lug 50 formed in the other post cover portion 16b (or 16a) has the bulging portion 48 which extends outward in the direction of width and which can be inserted into the cutout in the engaging frame 46 to establish engagement therewith; the lug 50 also has a slit 52 formed in the longitudinal direction so that the bulging portions 48 can deflect inwardly in the direction of width.

The engagement lug 50 is inserted into the engaging frame 46 with the bulging portions 48 being deflected by inward pressing in the direction of width and, thereafter, the deflecting pressure is removed, whereupon the bulging portions 48 come into engagement with the frame 46. This allows the pair of post cover portions 16a and 16b to be fixed together in an open state.

As shown in FIG. 7, the width a of cutout 54 in the engaging frame 46 is smaller than the width a of the engagement lug 50 as measured between the tops of bulging portions 48; therefore, once the bulging portions 48 have been brought into engagement with the frame 46, they will not slip out of the frame unless an external force is applied.

Both the engaging frame 46 and the engagement lug 50 are cantilevers that are formed integrally with the resin-made cover body 4. A thin-walled hinge 56 is formed at least on the base of the engagement lug 50 so that the lug will easily pivot and deform with respect to the post cover portions 16a and 16b when the work of engagement is being performed. This structural feature of the hinge 56 may be applied to the engaging frame 46.

In the first embodiment of the invention, the engaging projections 22 and the engaging recesses 24 which provide the temporary fixing portions 20 are formed by utilizing the thickness of the post cover portions 16a and 16b and, hence, the post cover portions may become of such a shape that holes will develop in the cutouts to provide pathways for the entrance of foreign matter such as dust or dirt particles or water into the cover. In contrast, the design of the second embodiment in which the temporary fixing portions 60 are provided outside the post cover portions 16a and 16b eliminates the possibility of the development of holes in those portions, thereby preventing the entrance of foreign matter into the cover as a result of the temporary fixing operation.

While the two embodiments of the present invention which are capable of attaining its first object have been described above, it should be understood that they are by no means the sole cases of the invention and that various other embodiments may be contemplated on the basis of the technical concept of the invention.

For instance, the shapes of the terminal cover portion 12 and the post cover portions 16a and 16b depend on the shapes of the connecting terminal 8 and the battery posts 14 to be connected and if the shapes of the latter change, the shapes of the former should accordingly be altered to preferred ones that cover them. In the embodiments described above, the hinge 18a between the terminal cover portion 12 and the post cover portion 16a and the hinge 18b between the terminal cover portion 12 and the post cover portion 16b are formed by thinning the wall of the respective joints. It should however be noted that a flexible connecting band or any other pivoting mechanism such as a hinge may be employed to connect the terminal cover portion 12 with each of the post cover portions 16a and 16b.

Third Embodiment

Figure 9A:
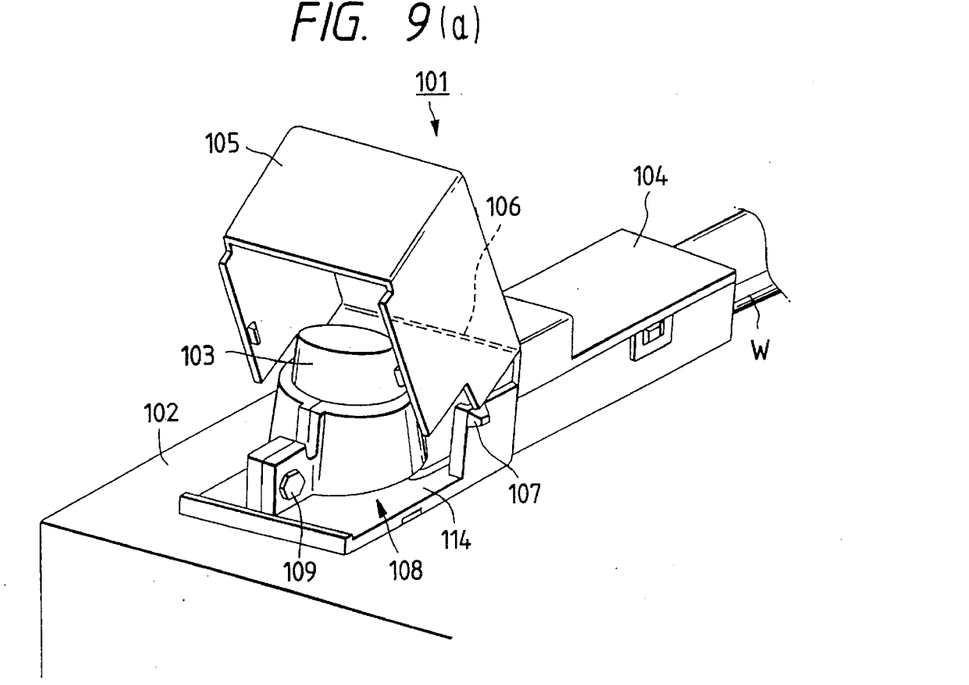
Figure 9B:
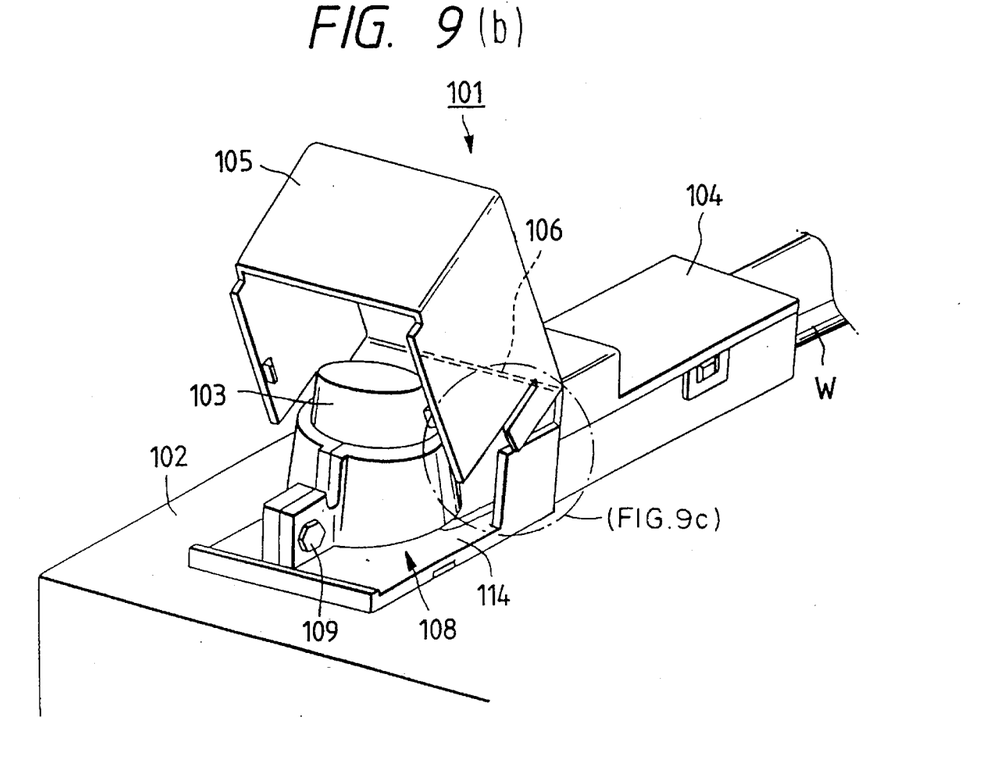
Figure 9C:
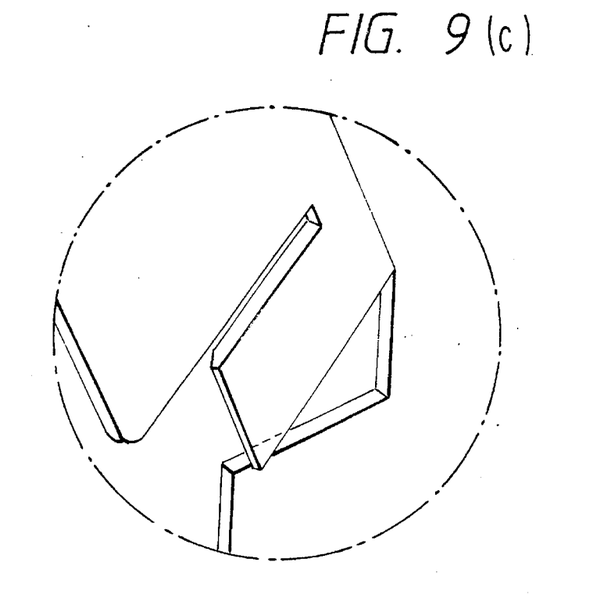

As FIGS. 9 (a) and 9 (b) show, the protective cover of a third embodiment which is generally indicated by 101 includes a cover portion 104 for enclosing the electric wire connecting portion of a connecting terminal 108, a freely operable lid portion 105 that is formed integrally with said cover portion via a hinge 106 and which serves as a lid on the electrical contact portion of the connecting terminal 108, and a base portion 114 that has a hole permitting the insertion of a battery post 103 and which is to be placed on top of a battery 102. Sidewalls are erected on both lateral ends of the base portion 114 and lid engaging portions 107 are formed on the upper ends of the respective sidewalls for accomplishing temporary engagement with the lower ends of the lateral sides of the lid portion 105 in an open state.

The connecting terminal 108 consists of the electrical contact portion which is to be wrapped onto the battery post 103 projecting beyond the top of the battery 102 and the electric wire connecting portion which provides connection to an electric wire W. The connecting terminal 108 is secured to the protective cover 101 by tightening a bolt 109 already fitted through the front end of the electrical contact portion.

Figure 10:
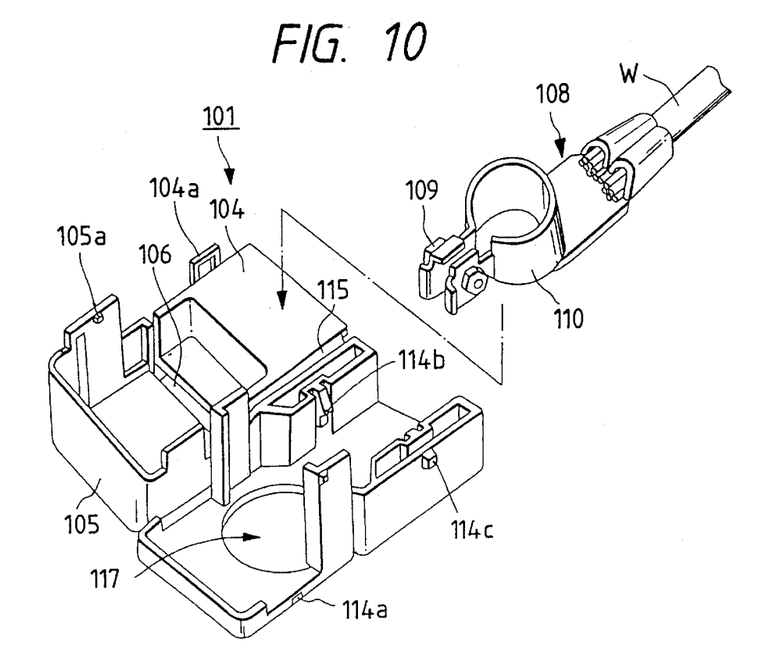
FIG. 10 is a perspective view showing the protective cover which is yet to be fitted with the connecting terminal.

First, as shown in FIG. 10, the cover portion 104 and the lid portion 105 are opened by means of a lateral hinge 115 formed along the length of the protective cover 101 and this brings the base portion 114 to an open state. The connecting terminal 108 has the electric wire W connected by means of a clamp mechanism 112 and it also has a wrapping portion 110 formed close to the front end. The base portion 114 has terminal engaging lugs 114b provided close to the rear end. The terminal 108 as placed on the base portion 114 is engaged by the terminal engaging lugs 114b in such a way that the center of the wrapping portion 110 coincides with the center of an insertion hole 117 made in the base portion 114.

In the next step, the cover portion 104 and the lid portion 105 which are joined by means of a hinge 106 are replaced and a lock receptacle 104a formed at a lateral end of the cover portion 104 is brought into engagement with a locking lug 114c formed in the rear side wall of the base portion 114, whereby the cover portion 104 is securely locked. However, the lid portion 105 remains in such a state that it can be easily opened or closed by pivotal movement on the hinge 106.

Figure 11:
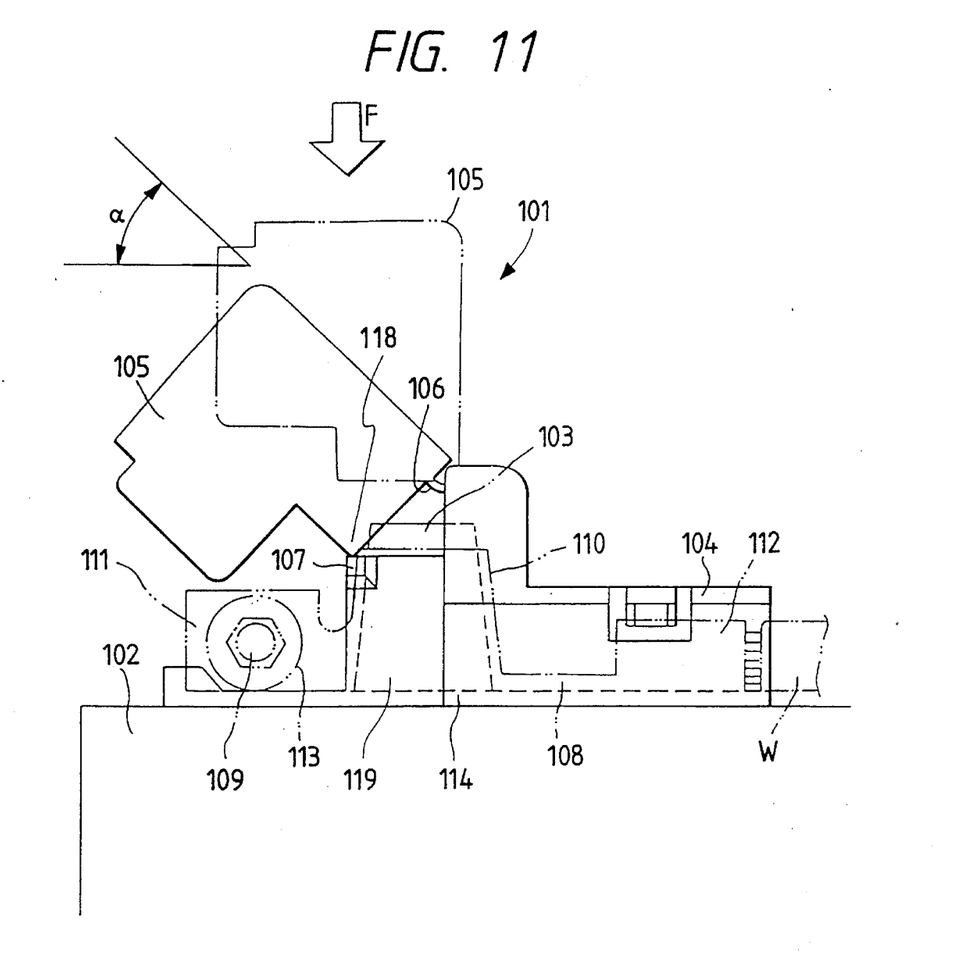
FIG. 11 is a side view of FIG. 9.

Subsequently, the protective cover 101 having fitted with the connecting terminal 108 is placed over a battery 102 as shown in FIG. 11, whereupon the battery post 103 passes through the insertion hole 117 to be fitted into the wrapping portion 110 of the connecting terminal 108. This enables the protective cover 101 to be positioned correctly on top of the battery 102. Then, a fastening tool such as a socket wrench is fitted for fastening the bolt 109 inserted through fastening lugs 111, and the lid portion 105 is opened to secure a working space 113 that allows for the tightening operation.

Figure 12A:
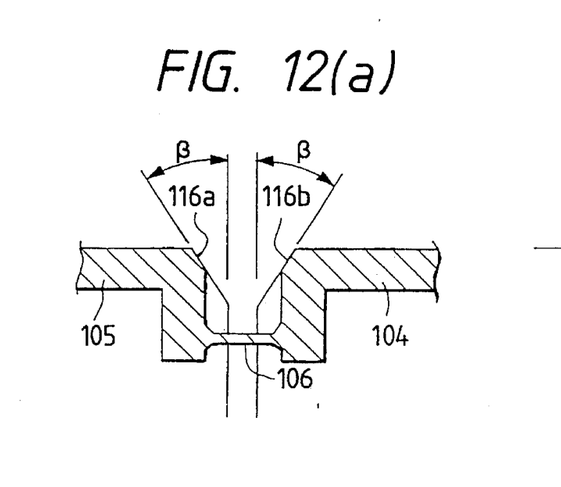
Figure 12B:
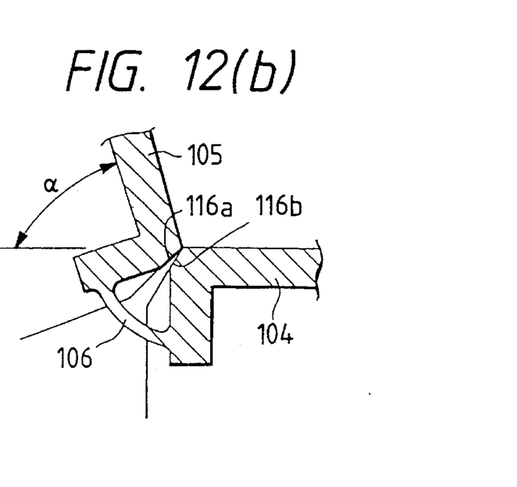

If the lid portion 105 is opened to the position indicated by a two-long-and-one-short dashed line, an external force F applied from above may potentially break the hinge 106. To avoid this problem, a beveled surface 116a having an inclination angle of β is formed at the rear end angular part of the lid portion 105 and another beveled surface 116b having the same inclination angle β is formed at the front end angular part of the cover portion 104 (see FIG. 12(a)). As shown in FIG. 12 (b), the two beveled surfaces 116a and 116b contact each other to regulate the clearance angle α and, at the same time, a lateral end portion 118 of the lid portion 105 is brought into engagement with the projecting lug 107 which is the lid engaging portion formed on the outer surface of a side wall 119 of the base portion 114. As a result, the lid portion 105 will be engaged in the right open position at the desired angle α, whereby the necessary working space 113 is secured to achieve marked improvement in the efficiency of tightening the bolt 109.

Figure 13:
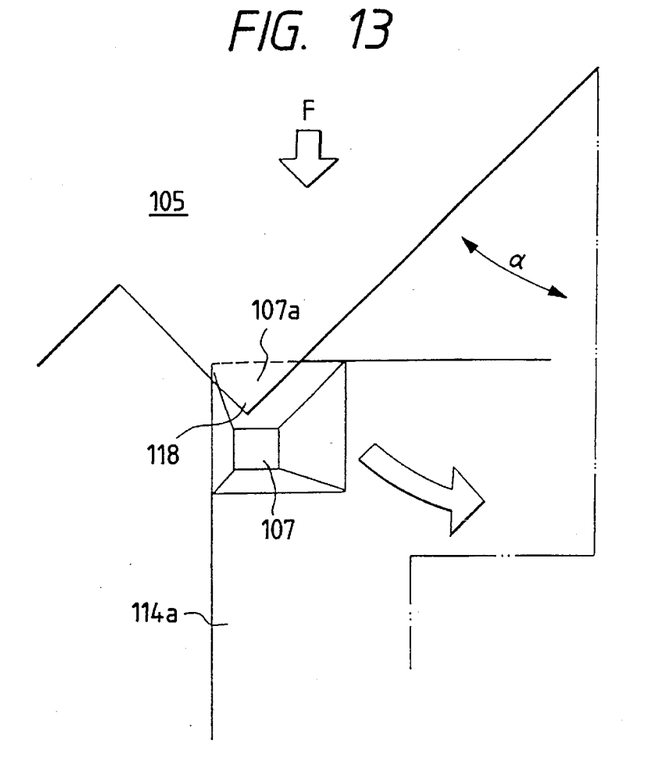
FIG. 13 is an enlarged illustration of the lid engaging portion.

If the lid portion 105 being engaged at the clearance angle is subjected to an external force F applied from above as shown in FIG. 13, the lateral end portion 118 of the lid portion 105 will slide down the inclined top surface 107a of the projecting plug 107 formed at the upper end of the side wall 119. The downward movement of the lid portion 105 along the inclined surface 107a continues as indicated by a bold arrow in FIG. 13 until it comes out of engagement with the projecting plug 107. In this way, one can avoid the concentration of the external force F at the hinge 106, thereby preventing its premature breakage.

Figure 14:
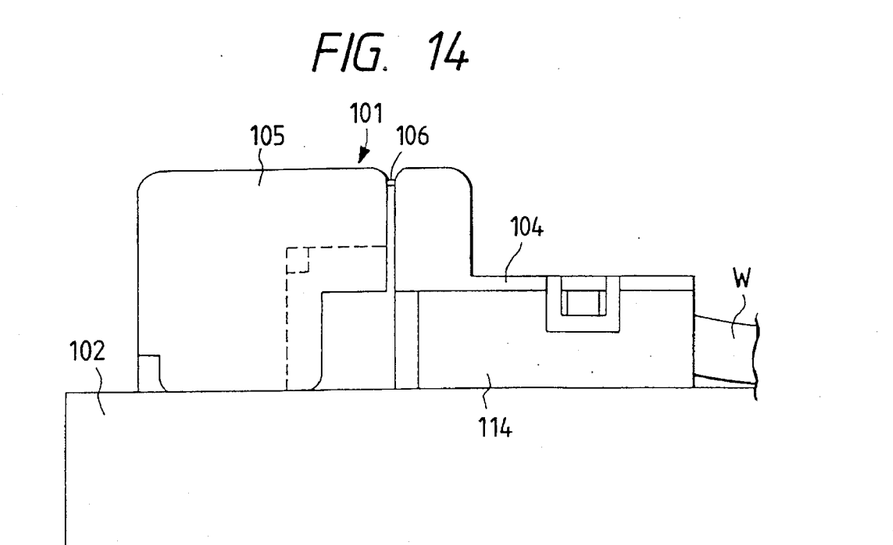
FIG. 14 is a side view of the protective cover with the lid portion being closed.

When the tightening operation ends as shown in FIG. 14, a compressive force is applied from above onto the lid portion 105 and by the same mechanism as what works when the external force F was applied, the lid portion 105 is fitted over the base portion 114. As a result, a locking lug 105a formed at a lateral bottom end of the lid portion 105 is brought into engagement with a lock receptacle 114 formed at the corresponding lateral end of the base portion. This causes the lid portion 105 to be locked by the base portion 114, completing the operation of securing the connecting terminal 108 to the battery post 103.

The invention is in no way limited to these embodiments described above and various modifications may be made. For example, the means for regulating the angle through which the lid portion is to be opened need not be the beveled surfaces which contact each other and it may be in the form of projections that are capable of regulating said angle. The means for permitting the lid portion to be engaged temporarily at a desired angle also need not be formed on the surface of the side wall of the base portion and, if desired, it may be formed on the inner lateral surface of the lid portion. It should also be mentioned that the lid engaging portion need not be the projecting lug and it may be of any structure that permits the lid portion to be engaged temporarily at a desired angle while effectively absorbing an applied external force. For example, the same effect can be attained by the structure shown in FIG. 9 (b) in which a lateral bottom end of the lid portion and the upper end of the side wall of the base portion are adapted to contact each other, with the edges of those ends being furnished with beveled surfaces.

In accordance with the present invention which provides a cover of a terminal for connecting battery posts, the terminal is preliminarily held on the cover base and then the terminal cover portion of the cover body is secured to assemble the cover. This provides ease in operations for connecting the posts by the terminal and mounting the cover on the terminal. The cover body also includes post cover portions that can be opened or closed. When mounting the connecting terminal to the cover body, the necessary coupling operation can be easily performed with the post cover portions being left open. After coupling is done, one only need close the post cover portions an secure them to the cover base. Thus, the cover can be mounted on the connecting terminal in a very easy manner.

As a further advantage, the cover body and the cover base are secured by means of the fixing portions which are capable of plastic deformation and, hence, the two members can be connected or disconnected in an easy manner.

The thusly mounted cover prevents the connecting terminal and the battery posts from contacting any external objects and this eventually prevents not only any unwanted damage of the connecting terminal, batteries and external objects due to their mutual contact, but also electrical accidents due to shorts and leaks.

In accordance with the present invention which provides a protective cover of a battery post connecting terminal, the contacting portions which regulate the opening angle of the cover to a desired value are provided in positions where the lid and cover portions face each other in the neighborhood of the hinge connecting those two portions; in addition, the lid engaging portion is provided for retaining the protective cover as it is held at the desired angle. This arrangement insures that the hinge will not break under an applied external force, whereby its reliability is improved. As a further advantage, the lid portion will not be an obstacle to the operation of fixing the connecting terminal and this contributes to a marked improvement in the efficiency of that operation.

What is claimed is:

1. A protective cover for a terminal comprising:

a cover base (114) for holding a terminal;

a cover body for covering the terminal mounted on said cover base, said cover body comprising a hinge (106), and a freely operable lid (105) supported by said hinge; and temporary opening holding means for holding said lid at a predetermined angle in a temporary open position to permit access to the terminal and for preventing an external force applied to said lid from being concentrated on said hinge.

2. A protective cover as claimed in claim 1, wherein said temporary opening holding means comprises:

a truncated square cone projection (107) provided on said cover base, wherein a rear end portion of said lid engages a surface of said truncated square cone projection to hold said lid in said temporary open position.

3. A protective cover as claimed in claim 1, wherein said lid (105) is connected to a cover portion (104) of said cover body by said hinge (106), and said cover portion (104) is connected to said cover base (114) by another hinge (115).

4. A protective cover as recited in claim 3, wherein said another hinge (115) is a lateral hinge formed along a side wall of said cover base, and said lid (105) is movable about two orthogonal axes corresponding, respectively, to rotation axes of said hinge (106) and said another hinge (115).

5. A protective cover as recited in claim 1, wherein said lid (105) and said cover base have bevelled edges (116a, 116b) adjacent said hinge (106) for regulating a clearance angle ($\alpha$) between said lid and said cover base.

6. A protective cover as recited in claim 1, wherein said predetermined angle is an acute angle formed between said lid and said cover base.

7. A protective cover as recited in claim 1, wherein said temporary opening holding means comprises:

a beveled surface provided on at least one of mating edges of said lid and said cover base.

8. A protective cover for covering a plurality of adjacent terminals, said protective cover comprising:

a cover base (6) for holding terminals;

a cover body (4) for covering the terminals mounted on said cover base, said cover body comprising a plurality of pivotally supported lids equal in number to the number of terminals; and temporary holding members provided on said lids for holding said lids at a predetermined angle to permit access to the terminals, said temporary holding members comprising an engaging member formed on each of said lids for engaging the engaging member of an adjacent lid to hold said lids at the predetermined angle.

9. A protective cover as claimed in claim 8, wherein the engaging members comprise at least one engaging recess formed on one of said lids and at least one engaging projection formed on another of said lids, said engaging projection fitting in said engaging recess to hold said lids at the predetermined angle.

10. A protective cover as claimed in claim 8, wherein the engaging members comprise at least one locking frame formed on one of said lids and at least one locking lug formed on another of said lids, wherein said at least one locking lug is inserted into said at least one locking frame to hold said lids at the predetermined angle.

* * * * *